United States Patent [19]

Eckart

[11] Patent Number: 5,463,832
[45] Date of Patent: Nov. 7, 1995

[54] SEALING OR GUIDING STRIP, WINDOW FRAME ASSEMBLY, AND METHOD OF MAKING WINDOW FRAME ASSEMBLY

[75] Inventor: Ralf Eckart, Viersen, Germany

[73] Assignee: Draftex Industries Limited, Edinburgh, Scotland

[21] Appl. No.: 173,700

[22] Filed: Dec. 22, 1993

[30] Foreign Application Priority Data

Dec. 29, 1992 [GB] United Kingdom .................... 9227039

[51] Int. Cl.[6] ...................................................... E06B 7/16
[52] U.S. Cl. ........................................................ 49/479.1
[58] Field of Search .......................... 49/479.1, 475.1, 49/493.1, 502

[56] References Cited

U.S. PATENT DOCUMENTS

| | | | |
|---|---|---|---|
| 3,445,965 | 5/1969 | Paulus | 49/479.1 |
| 3,958,369 | 5/1976 | Mathellier | 49/479.1 |
| 4,010,573 | 3/1977 | Andrzejewski | 49/479.1 |
| 4,183,778 | 1/1980 | Mesnel . | |

FOREIGN PATENT DOCUMENTS

| | | | |
|---|---|---|---|
| 2332409 | 6/1977 | France . | |
| 7147921 | 9/1982 | Japan | 49/479.1 |
| 0008111 | 1/1985 | Japan | 49/479.1 |
| 0285419 | 11/1989 | Japan | 49/502 |
| 4063721 | 2/1992 | Japan | 49/479.1 |
| 4066325 | 3/1992 | Japan | 49/479.1 |
| 765794 | 1/1957 | United Kingdom | 49/479.1 |
| 1084298 | 6/1966 | United Kingdom . | |
| 1488272 | 10/1977 | United Kingdom . | |
| 2062733 | 5/1980 | United Kingdom . | |
| 1579727 | 11/1980 | United Kingdom . | |
| 2172924 | 3/1986 | United Kingdom . | |
| 2260290 | 9/1992 | United Kingdom . | |

*Primary Examiner*—Peter M. Cuomo
*Assistant Examiner*—Jerry Redman
*Attorney, Agent, or Firm*—Leydig, Voit & Mayer, Ltd.

[57] ABSTRACT

A window frame carried on the door of a vehicle is in the form of an aluminum extrusion having a smooth bend in the region where the top of the frame meets the corner between the "B" pillar of the vehicle and the vehicle roof. The window glass has a sharp angle matching this corner. The aluminum extrusion carries a flange and is formed with a channel by means of which the window sealing and guiding strip can be secured to the frame. The sealing and guiding strip has a mitered corner matching the sharp angle of the window glass. For supporting the sealing and guiding strip in the region of this corner, a separate metal corner piece is provided. This has a shoulder which is a tight press fit into the channel on the aluminum extrusion. It is supplied to the vehicle manufacturer already attached to the sealing and guiding strip itself, so that the strip and the corner piece can be fitted to the frame in substantially a single press-fit operation. The metal piece is secured to the sealing and guiding strip during the moulding operation which produces the mitere-corner in two lengths of the strip which meet at the corner.

7 Claims, 4 Drawing Sheets

5,463,832

SEALING OR GUIDING STRIP, WINDOW FRAME ASSEMBLY, AND METHOD OF MAKING WINDOW FRAME ASSEMBLY

BACKGROUND OF THE INVENTION

The invention relates to sealing or guiding strips, window frame assemblies, and methods of making window frame assemblies. Embodiments of the invention, to be described in more detail below, are window sealing and guiding strips for use in motor vehicle body construction and, in particular, for use in window frames forming the upper part of vehicle doors, the frame supporting the edge of a window pane which can be raised from and lowered into the lower part of the door. However, the invention is not restricted to such applications.

BRIEF SUMMARY OF THE INVENTION

According to the invention, there is provided a sealing or guiding strip for sealing or guiding a sharp corner of a window pane, comprising flexible material for contacting the window pane, the flexible material being arranged to define the sharp corner, and including a stiff corner piece attached to the flexible material in the region of the sharp corner for supporting it there.

According to the invention, there is further provided a sealing and guiding strip for a window opening which has a window pane defining a sharp corner of predetermined angle and a relatively rigid frame defining a smooth curve at and bridging across the sharp corner, the sealing strip comprising flexible material defining two channels meeting at the sharp corner and sized to receive the edges of the window glass meeting there, and a rigid support member secured to the flexible material at the sharp corner for supporting it there and having a profile which, on the outside of the sharp corner, matches the profile there and, on the inside thereof, is curved to match the smooth curve.

According to the invention, there is also provided a method of constructing a window frame assembly carried by the upper part of a door in a vehicle body the window pane of which defines a sharp angle, comprising the steps of forming a relatively rigid window frame for the window opening, the window frame defining a smooth curve in the region of the frame corresponding to the sharp angle in the window pane, forming two lengths of channel-shaped sealing and guiding strip of flexible material whose channels are sized to receive the edges of the window glass which meet at the sharp angle therein, matchingly cutting respective end faces of the length of strip so that, when the lengths of strip are placed together with the faces in contact, the lengths of strip define the sharp angle between them, securing the end faces together, attaching a rigid support member to the lengths of strip in the region of the sharp angle, the rigid support having a profile following the lengths of the strip where they meet at the sharp angle and also defining a curved region bridgingly extending between the lengths of strip on the inside of the sharp angle and matching the said curve in the frame, transporting the secured lengths of sealing strip with the support member attached thereto to the frame, and securing them to the frame so that the channels of the flexible material seal over the edge of the window pane and so that the flexible material is supported from the frame at the sharp angle by the rigid support member and is directly supported by the frame elsewhere.

DESCRIPTION OF THE DRAWINGS

A window sealing and guiding strip embodying the invention, and a method according to the invention of constructing a window frame assembly, will now be described, by way of example only, with reference to the accompanying diagrammatic drawings in which.

DESCRIPTION OF PREFERRED EMBODIMENTS

Figure 1:
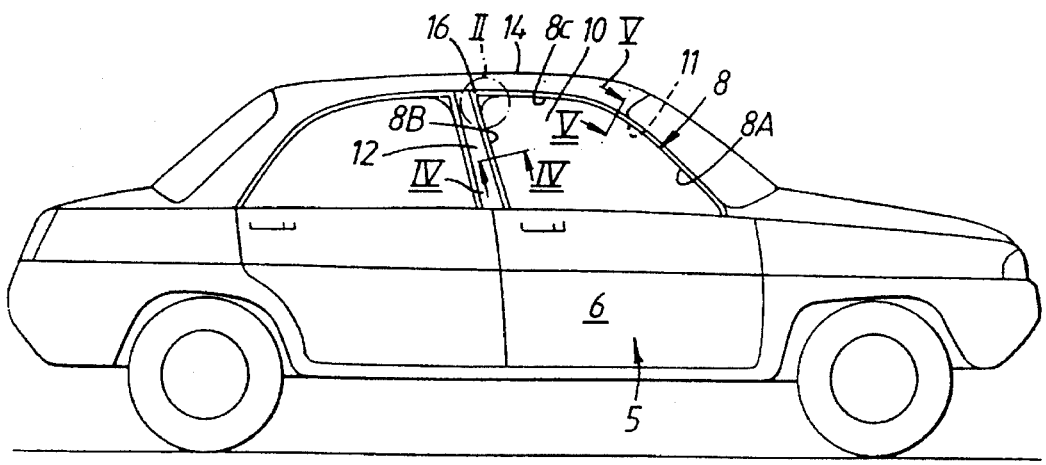
FIG. 1 is a side view of a motor vehicle body.

FIG. 1 shows the side of a motor vehicle body having a door 5 with a lower part 6 carrying a window frame indicated diagrammatically at 8 for a window opening 10. In the usual way, a window glass for the opening 10 can be raised from and lowered into the lower part 6 of the door. The frame 8 carries the sealing and guiding strip 11 (not visible in FIG. 1) which will be described in detail below.

The frame 8 comprises a part 8A along the sloping front of the door which is alongside the so-called "A" pillar of the vehicle body, a generally vertical part 8B alongside the so-called "B" pillar 12 of the vehicle body, and a part 8C running along the top of the door.

Where the "B" pillar 12 meets the roof 14 of the vehicle, a sharp angle (substantially 90°) is formed, at 16. In a manner to be explained below, the sealing and guiding strip 11 to be described combines with the frame 8 to form a corresponding sharp angle 18.

Figure 2:
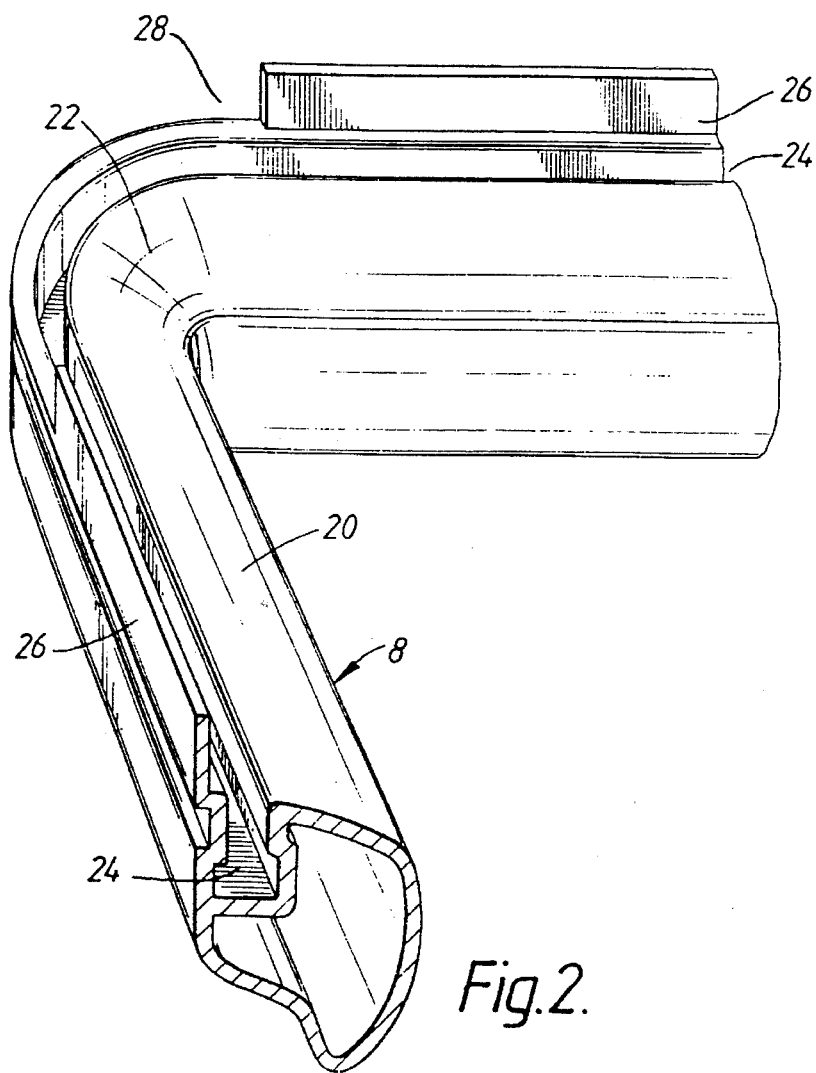
FIG. 2 is a diagrammatic perspective view of part of the window frame shown circled at II in FIG. 1 but omitting the window sealing and guiding strip.

The frame 8 carried by the door is (in this example) made of metal, such as extruded aluminium. FIG. 2 shows part of the frame 8 at the corner 18 and is an enlarged view of the region II of FIG. 1. The sealing and guiding strip is omitted from FIG. 2. As indicated in FIG. 2, the frame is made of a hollow aluminium extrusion 20 which has a curved portion 22 at the corner 18 and a hollow interior 23. As shown in FIG. 1, therefore, this curved portion 22 bridges across the sharp corner.

Facing outwardly of the vehicle, the aluminium extrusion 20 defines a channel 24 and an outwardly protruding flange 26. However, it will be noted that the flange 26 is interrupted (that is, omitted) over the curved region 22 of the extrusion, so as to form a gap 28.

Figure 3:
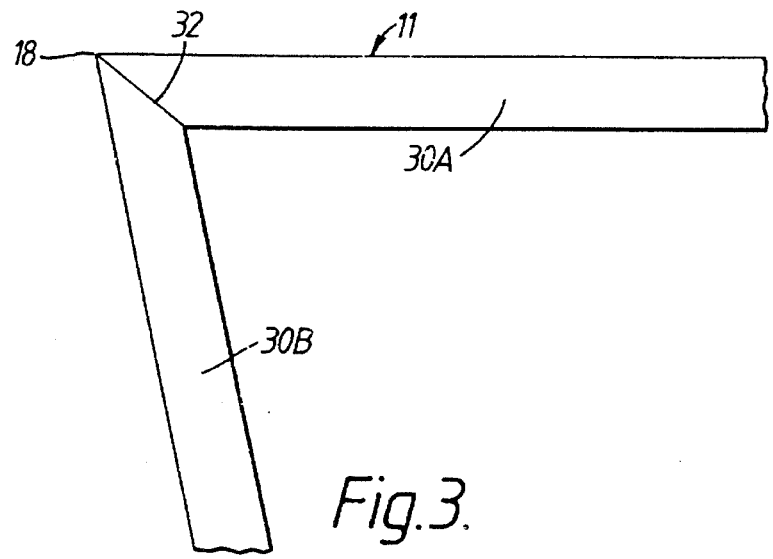
FIG. 3 is a diagrammatic side view of one form of the sealing and guiding strip.

FIG. 3 shows the sealing and guiding strip 11 in side view as it appears from the outside of the vehicle when fitted onto the aluminium extrusion 20 (in a manner to be explained), FIG. 3 showing the sealing strip in the form which it has in the region of the corner 18. As shown in FIG. 3, the strip 11 is made up of two lengths 30A and 30B whose forms will be described in detail below. They are connected together by a "mitred" joint at 32 to match the angle 18 (FIG. 1). In a manner to be described in more detail below, the strip 11 provides a channel in which the window glass slides in use. The strip 11 continues, of course, over the remainder of the window frame 8.

Figure 4:
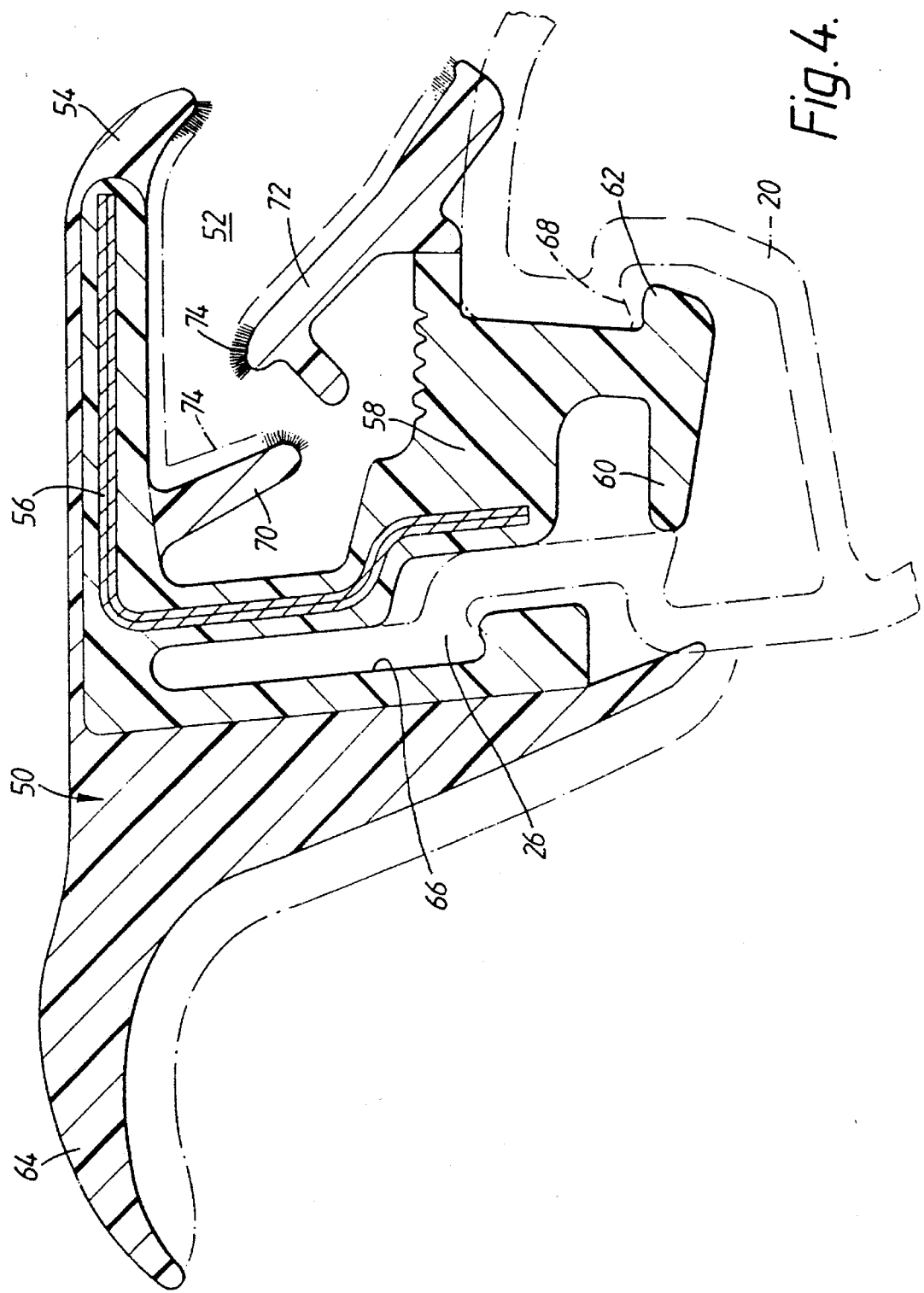
FIG. 4 is a cross-section on the line IV—IV of FIG. 1, showing the sealing and guiding strip of FIG. 3 in position on the frame.

FIG. 4 shows a cross-section through the length of strip 30B (FIG. 3) when fitted in position onto the corresponding portion of the aluminium extrusion 20. As shown, the strip is made of extruded plastics or rubber material 50 defining a channel 52 in which the window glass (not shown) slides. The channel 52 is defined in part by a lip 54 on the outside of the vehicle and in which is embedded a metal carrier 56 for reinforcing purposes. The metal carrier 56 may take any suitable form. It may be solid strip or it may be apertured or in other manner arranged to be slightly flexible. The metal carrier 56 extends around the base of the channel 52 and into thicker material 58 which forms the opposite side of the channel 52 and extends away from the channel 52 to define a lip 60 providing a shoulder 62.

The portion of the metal carrier 56 within the lip 54 strengthens the lip 54 so that the lip can be of minimal thickness. In this way, there is little material on the outside of the window glass in use and a substantially "flush glass" effect is produced.

The material 50 extends in the opposite direction to the lip 54 to produce a further lip 64, and also defines a slot 66.

As shown in FIG. 4, the flange 26 of the aluminium extrusion 20 forming the window frame (see FIG. 2) extends into the slot 66 and is gripped thereby, and the lip 60 and shoulder 62 extend into the channel 24 of the aluminium extrusion, the shoulder 62 locking under a corresponding ridge 68 of the extrusion. The lip 60 makes contact with the opposite side of the channel 24 and holds the shoulder 62 and the ridge 68 in engagement with each other.

On the inside of the channel 52, the material 50 defines inwardly extending flexible lips 70 and 72 which flex upon entry of the window glass and help to seal against its opposite faces. The underside of the lip 54 and the outwardly facing surfaces of the lips 70 and 72 are preferably covered in flock 74 or similar material to provide reduced friction and enhanced sealing againsts the glass.

The lip 64 bridges over the gap between the outside of the window frame 8 and the adjacent "B" pillar of the vehicle body.

Figure 5:
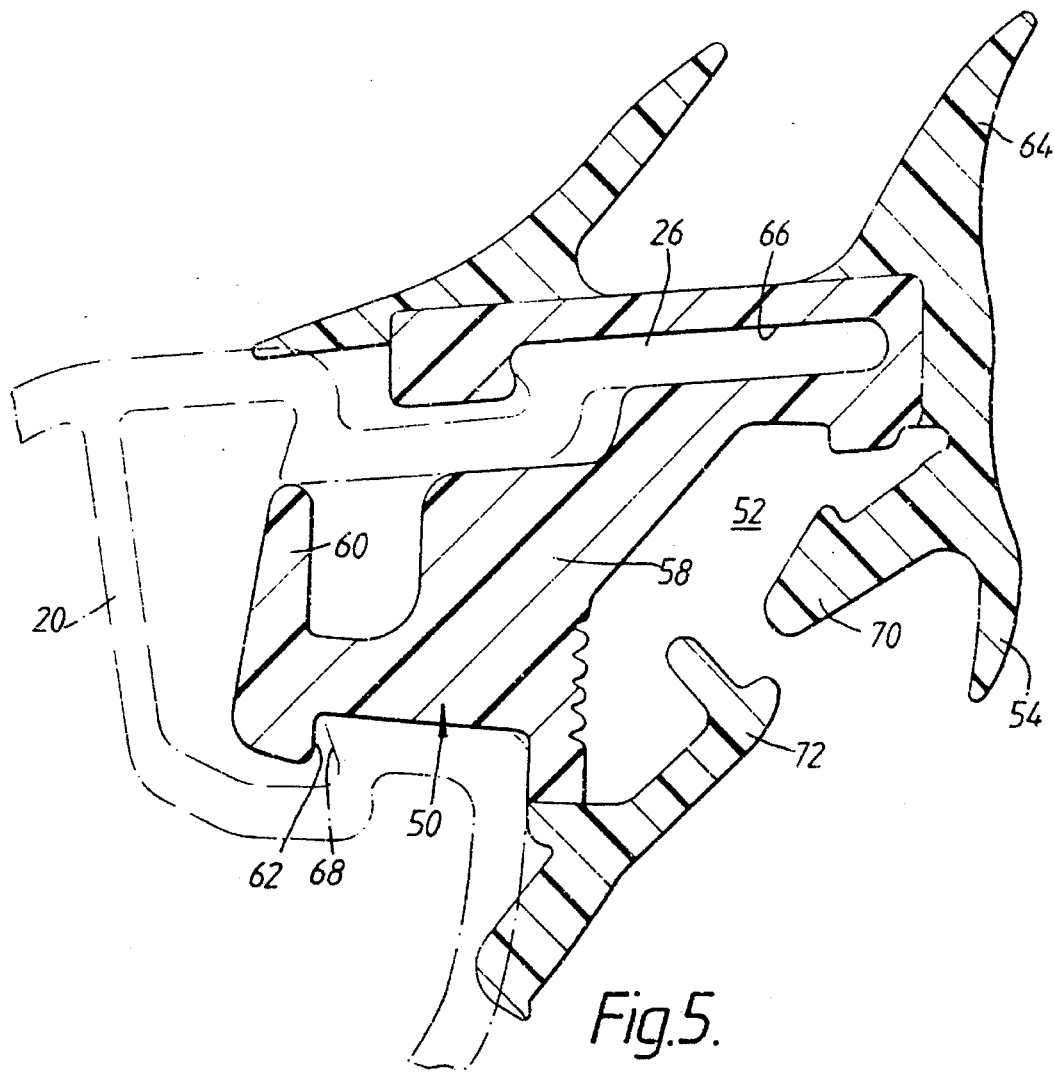
FIG. 5 is a cross-section on the line V—V of FIG. 1, showing the sealing and guiding strip of FIG. 3 in position on the frame.

FIG. 5 corresponds to FIG. 4 but shows the form which the length of strip 30A (see FIG. 3) takes, that is, the form which it takes along the top of the door.

As shown, it is of the same general form as shown in FIG. 4 and corresponding items are similarly referenced. It will be noted, though, that the strip 30A does not contain the metal carrier 56.

FIGS. 4 and 5 show how the lengths 30A and 30B of strip 30A and 30B are supported on the extrusion 20. However, it will be apparent that the strip 11 cannot be supported in the same way in the immediate region of the corner 32 (see FIG. 2), because, over this region, the strip 11 has a sharp corner, whereas the aluminium extrusion 20 has a smooth bend 22.

Figure 6:
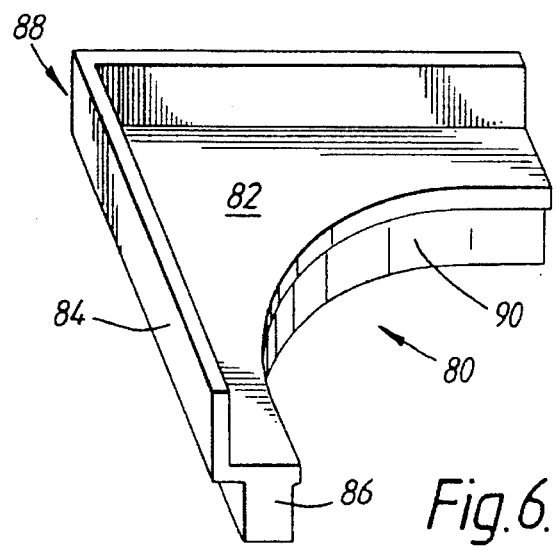
FIG. 6 is a perspective view of a corner piece for the sealing and guiding strip.

In order to support the strip 30 in the region of this corner, therefore, a corner piece 80 (FIG. 6) is used. The corner piece 80 is preferably made of metal such as aluminium. It is of simple construction comprising a platform 82 which, on one side, carries a flange 84 of the same general thickness as the flange 26 on the aluminium extrusion 20 (see FIG. 2) and, on its other side, carries a thicker shoulder 86. The corner piece 80 is shaped to provide an outside edge 88 which matches the angle at the corner 18. Its opposite edge 90 is curved to match the outside radius of the curved portion 22 (see FIG. 2) of the aluminium extrusion 20.

The corner piece 80 is secured to the strip 11 at the mitred corner 32 (FIG. 3). This is achieved by fitting the flange 84 of the corner piece 80 into the slots 66 (see FIGS. 4 and 5) in the lengths 30A and 30B of the strip; at the mitred corner, the slots 66 will of course not be filled by the flange 26 (FIG. 2) of the aluminium extension 20, because the flange is omitted from the extension at the position of the corner. This fitting process is carried out during the assembly operation which forms the mitred corner between and connecting the lengths 30A and 30B of strip. This assembly process is carried out in a mould. The end faces of the two lengths 30A and 30B of strip are respectively cut at the correct angles and placed in a mould which also contains the metal corner piece 80. The lengths 30A and 30B of strip are fitted onto the corner piece 80 by ensuring that the latter's flange 84 fits into the slots 66. The mould is then closed and heat is applied so as to seal the cut end faces of the strip lengths 30A and 30B together and to secure them to the metal corner piece 80.

The length of strip 30, matching the complete length of the window frame 8, and also carrying the corner piece 80, is then ready for fitting onto the window frame. As already explained, this process is carried out by inserting the lip 60 and the shoulder 52 of the lengths 30A and 30B of strip into the channel 24 of the aluminium extrusion 20, so that the flange 26 of the latter becomes inserted into the slot 66. In addition, however, the fitting process involves the attachment of the metal corner piece 80 to the extrusion 20, over the latter's curved region 22 (FIG. 2). This is achieved by slotting the shoulder 86 (FIG. 6) of the corner piece into the channel 24 over the curved region, in which it is a tight fit.

Figure 7:
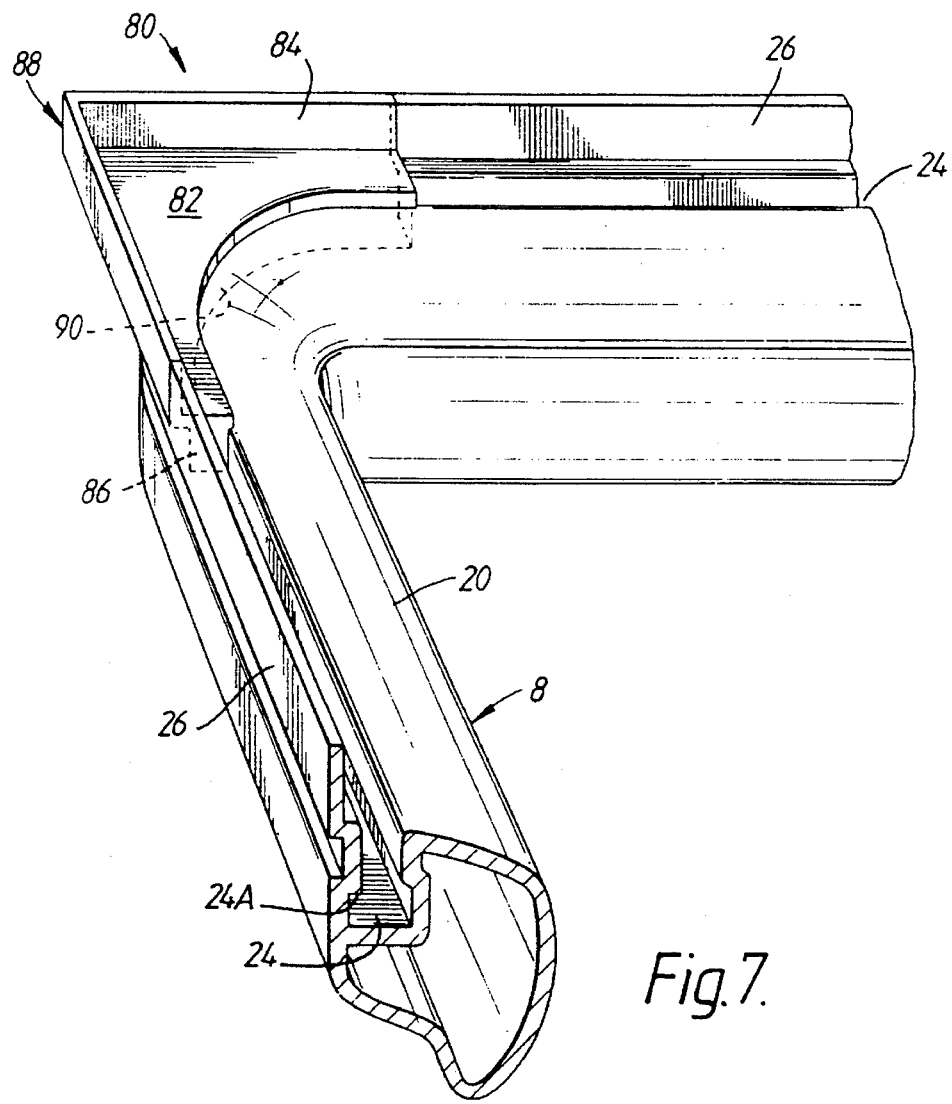
FIG. 7 is a perspective view of the frame of FIG. 2 but also showing the corner piece in position thereon.

FIG. 7 shows the appearance of the window frame when the corner piece 80 is in position. For clarity, though, the sealing strip 11 itself is not shown in this Figure. This Figure shows how the corner piece 80, now being firmly supported on the aluminium extrusion 20, can in turn support the sealing strip in the region of the corner 18.

The corner piece 80 is preferably covered in rubber; this may be carried out during the above-mentioned moulding operation. It may also be flocked.

In this way, therefore, the window frame itself (the aluminium extrusion 20) can be arranged to have a smooth curve in the region of the corner 18 of the door. This simplifies construction of the frame considerably. If the frame had to have a sharp corner matching the angle 18, a welding operation would be necessary. The smooth curve can be achieved by a much simpler bending operation. Nevertheless, the corner piece 80 enables the sealing strip 30 to have the required sharp corner to match the angle 18 and to provide proper support for the corner of the window glass and effective sealing. However, the corner piece is carried by and secured to the strip 11 and its manufacture and attachment to the sealing strip is carried out by the sealing strip supplier, not by the vehicle manufacturer. All that the vehicle manufacturer has to do is to attach it and the sealing strip in substantially a single operation to the window frame. For example, the vehicle manufacturer is not involved in any complicated welding operation to secure the corner piece 80 in position; it is simply a matter of a press-fitting operation.

The corner piece 80 can be arranged to lock into the channel 24, instead of merely being a press fit therein. For example, its shoulder 86 can be provided with a formation to lock under the undercut 24A (FIG. 7).

The arrangement described is advantageous in that it enables the frame of the door opening to be of stronger construction: this is because the frame can be of curved configuration at the point 16 (FIG. 1) instead of being a sharp corner. The inner door seal (that is, the door seal attached to the frame of the door opening) can be of correspondingly curved shape—that is, it can be formed by a length of seal simply bent to follow the curve of the frame. It is not necessary for it to be formed with a mitred corner. Thus, from the outside of the vehicle, with the door closed, the appearance is that of a mitred corner, yet the door and body construction is simply curved.

I claim:

1. In combination, a rigid frame for a window opening, a window pane for the window opening, and a flexible sealing and guiding strip for mounting around the window opening on said frame, the window pane defining a sharp corner having a fixed angle, the rigid frame defining a smooth curve at and bridging across the sharp corner, the sealing strip comprising flexible material defining two channels meeting at the fixed angle which are sized to receive the edges of the window pane meeting at the sharp corner, and a rigid support member secured to the flexible material where the two channels meet and having a sharp profile matching and aligned with the fixed angle and a smoothly curved inner profile bridging across the fixed angle and matching the smooth curve of the frame, the rigid support member including locking means for lockably mounting the support member on the frame in the region of the smooth curve of the frame for supporting the flexible material at and projecting outside of the smooth curve so that the two meeting channels receive the sharp corner of the window pane.

2. A strip according to claim 1, in which the locking means of the support member defines a rigid projection running along the said smoothly curved profile of the support member and sized to fit lockingly into a corresponding channel in the frame at the said smooth curve of the frame.

3. A strip according to claim 1, in which the flexible material includes means for mounting it on the frame.

4. A strip according to claim 3, in which the flexible material defines a slot extending longitudinally along its length for embracingly gripping an edge or flange on the frame, whereby the strip is mounted on the frame.

5. A strip according to claim 4, in which the support member defines an edge or flange which is embracingly gripped by the said slot whereby the support member is secured to the flexible material.

6. A strip according to claim 4, in which, when the support member is fitted in position on the frame, its edge or flange is aligned with the edge or flange on the frame.

7. A strip according to claim 3, in which the flexible material defines a projecting part extending along the length of the strip and which, in use, lockingly engages a channel running along the frame whereby the strip is mounted on the frame.

* * * * *